United States Patent
Bobkov et al.

(10) Patent No.: US 7,250,541 B2
(45) Date of Patent: Jul. 31, 2007

(54) METHOD FOR SUPPRESSING NARROWBAND NOISE IN A WIDEBAND COMMUNICATION SYSTEM

(76) Inventors: Mihail Nikolaevich Bobkov, ul. Novogireevskaya, d.4, kv. 103, Moscow (RU) 111123; Aleksei Aleksandrovich Galitsin, ul. Kommunisticheskaya, d.18, kv.158, Lubertsky, Moskovskaya obl. (RU) 140013; Vasiliy Vasilievich Kalugin, d.3, kv.33, derevnya Novo-Shihovo, Moskovskaya obl. Odinoovakski (RU) 143092

( * ) Notice: Subject to any disclaimer, the term of this patent is extended or adjusted under 35 U.S.C. 154(b) by 51 days.

(21) Appl. No.: 10/524,988

(22) PCT Filed: Aug. 19, 2003

(86) PCT No.: PCT/RU03/00371

§ 371 (c)(1),
(2), (4) Date: Oct. 4, 2005

(87) PCT Pub. No.: WO2004/019507

PCT Pub. Date: Mar. 4, 2004

(65) Prior Publication Data

US 2006/0140316 A1    Jun. 29, 2006

(30) Foreign Application Priority Data

Aug. 22, 2002    (RU) .............................. 2002122545

(51) Int. Cl.
*H03D 1/04* (2006.01)
(52) U.S. Cl. ........................ 570/340; 370/317; 455/296
(58) Field of Classification Search ............... 370/346, 370/317–318, 326, 333, 335–336, 342–343, 370/345, 441–442; 375/206, 347, 267, 349, 375/140, 144, 147–148; 455/296, 278.1, 455/306, 303

See application file for complete search history.

(56) References Cited

U.S. PATENT DOCUMENTS 4,947,177 A    8/1990    Fothergill (Continued)

FOREIGN PATENT DOCUMENTS

EP    0372369    6/1990

(Continued)

*Primary Examiner*—Pablo N. Tran
(74) *Attorney, Agent, or Firm*—Donn K. Harms

(57) ABSTRACT

This invention is used in communications, for example, in expanded signal spectrum broadband communication systems. The technical effect of this invention consists in an enhanced narrow-band interference suppression factor and almost complete elimination of the effect displayed by a powerful narrow-band interference or a group of narrow-band interferences in a limited frequency band. A noise signal formed in the frequency band $(F_0, F_1)$ in the transmission channel of a broadband communication system is power-modulated by a given modulation technique at a modulation frequency $F_{mod} \ll (F_1-F_0)$ and passed through a propagation medium, in which a narrow-band interference is superimposed thereon; received in the receiver; filtered in the frequency band $(F_0, F_1)$; amplified, and divided into two signals. One of the signals is obtained by amplifying the filtered signal and limiting the amplitude thereof, and the other signal is the filtered signal or a signal linearly amplified without altering the shape thereof. The two signals obtained are then multiplied; the resultant signal is filtered in the frequency band $[\Delta F_{nar}, (F_1-F_0)]$; and the envelope of the signal obtained by filtration in the frequency band $[\Delta F_{nar}, (F_1-F_0)]$ is separated in order to be subsequently demodulated and to give an information signal.

1 Claim, 2 Drawing Sheets

U.S. PATENT DOCUMENTS

| | | | |
|---|---|---|---|
| 5,596,600 A * | 1/1997 | Dimos et al. | 375/148 |
| 5,717,717 A * | 2/1998 | Yang et al. | 375/232 |
| 5,982,825 A * | 11/1999 | Tsujimoto | 375/347 |
| 6,807,405 B1 * | 10/2004 | Jagger et al. | 455/296 |
| 7,113,476 B2 * | 9/2006 | Tulino | 370/203 |
| 7,133,355 B1 * | 11/2006 | Gerakoulis | 370/208 |
| 7,158,474 B1 * | 1/2007 | Gerakoulis | 370/206 |
| 2002/0154620 A1 * | 10/2002 | Azenkot et al. | 370/347 |
| 2002/0196765 A1 * | 12/2002 | Tulino | 370/342 |
| 2003/0021237 A1 * | 1/2003 | Min et al. | 370/252 |

FOREIGN PATENT DOCUMENTS

| | | |
|---|---|---|
| RU | 2007872 | 2/1994 |
| RU | 2127021 | 2/1999 |
| SU | 1338078 | 9/1987 |

* cited by examiner

METHOD FOR SUPPRESSING NARROWBAND NOISE IN A WIDEBAND COMMUNICATION SYSTEM

(i) SCOPE OF THE INVENTION

This invention relates to radio engineering and can be used in communication equipment, for example, in expanded signal spectrum broadband communication systems.

(ii) PRIOR ART OF THE INVENTION

Conventional systems expand the signal spectrum by modulating signal amplitude, phase and frequency, or a combination of these. Narrow-band interferences, that is, interferences having all energy thereof concentrated within a narrow frequency band, are the main kind of interference. Filtering a composite signal in a receiver experiencing the effect of fluctuating noise and powerful narrow-band interferences in a desired signal spectrum is, therefore, a very insistent task. Action to deal with it is called for by the fact that a powerful narrow-band station can disrupt communications in broadband systems completely, because the correlator multiplier converts a narrow-band interference into a pulse-phase signal having a linear spectrum with an envelope proportional to sin(x)/x, so that in the presence of a powerful enough interference, noise level at the correlator output can exceed that of the convolved desired signal.

There are many methods to correct this deficiency, for example, by quasi-optimal linear filtration, trapping of a spectrum section, compensation techniques, and so on (1).

These prior art methods are deficient because of their complexity.

The closest prior art of this invention is a method of suppressing narrow-band interferences in a broadband communication system, wherein the transmitting channel is used to generate a desired signal to be transmitted; the pseudo-random signal frequency cycle parameter $F_{prp}$ is altered in accordance with given information; a digital phase noise signal is formed at a central frequency $F_0$ and logically summed up with the digital pseudorandom signal formed previously; the resultant signal is amplified in the receiver; the signal transmitted is received together with a narrow-band signal superimposed thereon in the propagation medium in the frequency band $F_{nar} << F_{prp}$; the signal received is filtered by passing it through a high-frequency bandpass filter at a pass band frequency $2F_{prp}$ and central frequency $F_0$; the input signal is converted into a voltage proportional to power; the resultant signal is filtered in the frequency band $(F_0-F_{prp})$ and amplified; the resultant signal is limited; and a correlation processing method is then used to obtain an error signal as the difference between the clock frequency $F_{prp}$ of the signal being transmitted and the respective clock frequency of the receiver (2).

The prior art method is disadvantageous because of its low interference suppression factor when interferences are generated by powerful narrow-band stations.

(iii) DISCLOSURE OF THE INVENTION

The technical effect of this invention consists in raising the narrow-band interference suppression factor in the receiver and almost completely eliminating the influence of a powerful narrow-band interference or a group of narrow-band interferences in a limited frequency band, including frequency-modulated and scanning interferences, as a result of which communication quality is improved by enhancing noise immunity of the desired signal.

This technical result is achieved by a method of suppressing a narrow-band interference in a broadband communication system, wherein a broadband noise signal is generated in the transmission channel in a frequency band $(F_0, F_1)$; the broadband noise signal is modulated by a given modulation technique for modulating power at a modulation frequency $F_{mod} << (F_1-F_0)$; the resultant signal is passed through a propagation medium and received in the receiver together with a narrow-band interference superimposed thereon in the propagation medium, and filtered in the frequency band $(F_0, F_1)$; two signals are generated, one of which is obtained by amplifying a signal filtered in the frequency band $(F_0, F_1)$ and limiting the amplitude thereof, and the other signal is the above filtered signal or a filtered signal linearly amplified without altering the shape thereof; the two signals thus obtained are multiplied; the resultant signal is filtered in a frequency band $[\Delta F_{nar}, (F_1-F_0)]$; the envelope of the resultant signal is selected and demodulated to obtain an information signal, wherein $\Delta F_{nar}$ is the frequency band of the squared amplitude variation spectrum of the narrow-band interference voltage.

(iv) PREFERRED EMBODIMENTS OF THE INVENTION

Figure 1:
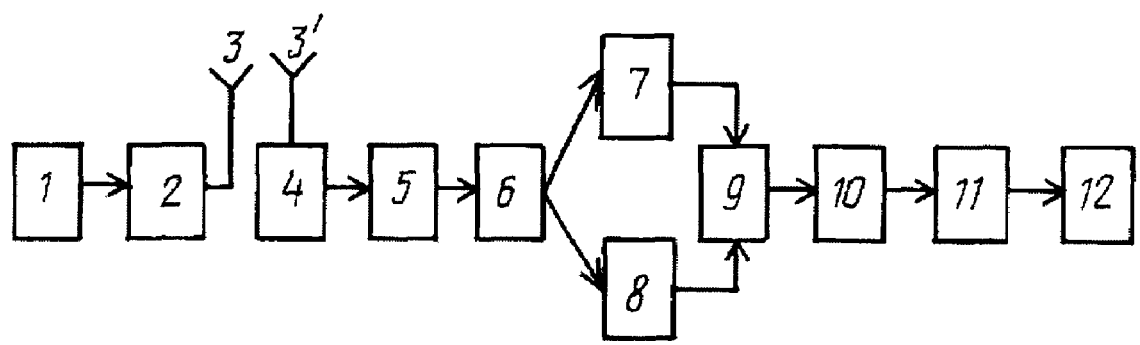
FIG. 1 shows a block diagram of an apparatus designed to implement the present method of suppressing a narrow-band interference in a broadband communication system.
Figure 2:
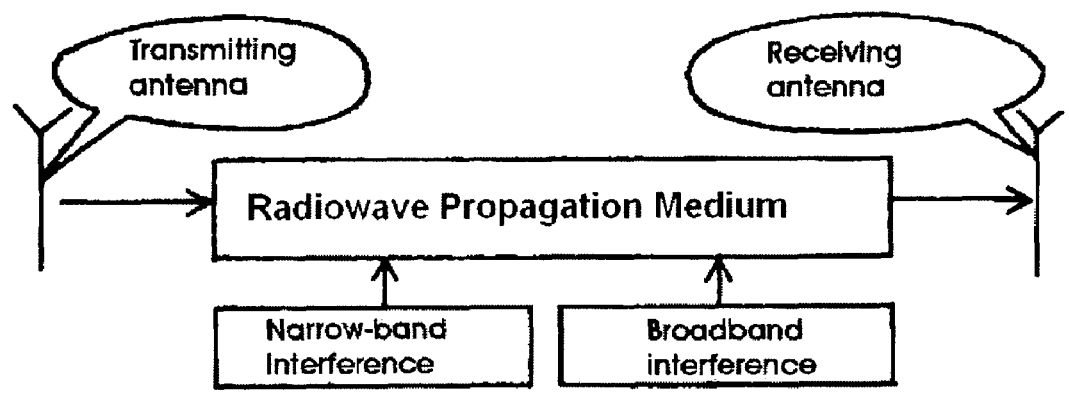
FIG. 2 shows a block diagram of a propagation medium.

An apparatus used to carry out the present method of suppressing a narrow-band interference in a broadband communication system comprises a transmission channel containing a broadband noise signal generator 1 connected in series to a modulator 2 and a transmitting antenna 3 (FIG. 1), from which a signal is transmitted through a propagation medium (FIG. 2) to the receiving antenna of a receiver 4 that applies the signal to the input of a bandpass filter 5 having a frequency band $(F_0, F_1)$, the output of which is connected to the input of an amplifier 6. The output of amplifier 6 is connected to the inputs of a linear amplifier 7 and a limiting amplifier 8, which have outputs connected to the inputs of a multiplication unit 9 having an output connected to the input of a bandpass filter 10 having a frequency pass band $[\Delta F_{nar}, (F_1-F_0)]$. The output of bandpass filter 10 sends a signal to the input of a unit 11 separating the signal filtered in the frequency band $[\Delta F_{nar}, (F_1-F_0)]$. The resultant signal is applied to a demodulator 12 to separate an information signal.

Figure 3:
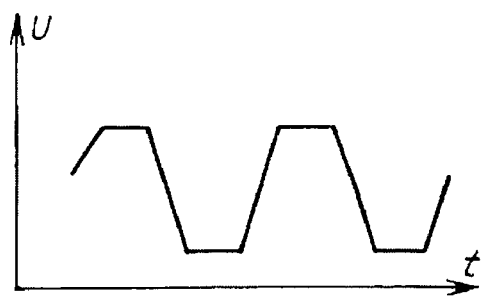
FIG. 3 shows the shape of a signal filtered in the frequency range $(F_0, F_1)$, which is received following its amplification and limitation.
Figure 4:
FIG. 4 shows the shape of a signal filtered in the frequency band $(F_0, F_1)$ or a linearly amplified signal filtered in the frequency band $(F_0, F_1)$.
Figure 5:
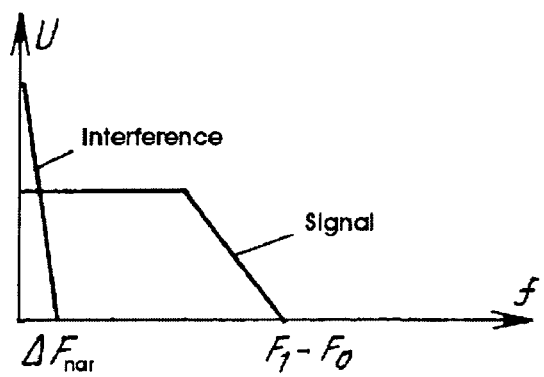
FIG. 5 shows the spectrum of a resultant signal obtained by multiplying the above two signals.
Figure 6:
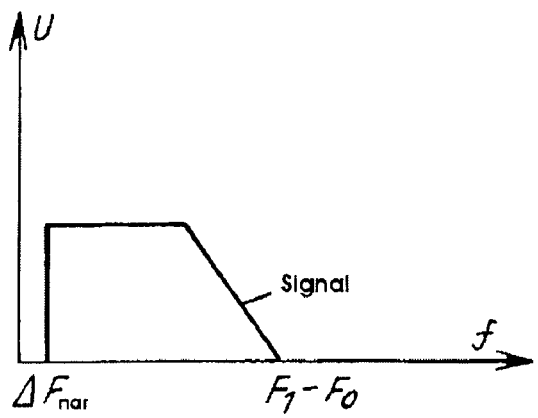
FIG. 6 shows the spectrum of a resultant signal filtered in the frequency band $[\Delta F_{nar}, (F_1-F_0)]$.

The present method of narrow-band interference suppression in a broadband communication system is performed as follows:

Generator 1 of the transmission channel produces a broadband noise signal in the frequency band $(F_0, F_1)$ that is power-modulated (in modulator 2) by a given modulation technique at a modulation frequency $F_{mod} << (F_1-F_0)$. The resultant signal is transmitted to a propagation medium, such as radio ambient (FIG. 2), where a narrow-band interference is superimposed on it. The narrow-band interference superimposed on the broadband noise signal in the propagation medium may be amplitude-modulated, frequency-modulated, scanning, and so on, but it is required to fulfill the following conditions: the narrow-band interference frequency $F_{nar}$ must fulfill the condition $F_0<F_{nar}<F_1$, and the frequency band of the squared amplitude variation spectrum of the interference voltage ($\Delta F_{nar}$) must be much smaller than the frequency band of the squared amplitude variation spectrum of the modulated broadband noise signal voltage at the reception point. The receiver input is, therefore, supplied with a signal equal to the vector sum of a desired signal voltage $U_{sig}$ and a narrow-band interference voltage $U_{nar}$. This mixed signal is applied to the input of bandpass filter 5 having a frequency pass band ($F_0$, $F_1$). Then the filtered signal pre-amplified in amplifier 6 is divided into two signals. The first signal is obtained after the signal filtered in the above frequency band, and its amplitude limited, has been amplified in amplifier 8. As the signal passes, together with the interference, through the limiting amplifier and the amplifier interference suppresses the desired signal, and the amplifier output gives a normalized signal $U_{nar}/|U_{nar}|$. The second signal is the above filtered signal or a filtered signal amplified in linear amplifier 7. Linear amplifier 7 does not alter the shape of the filtered signal, which will have the form of $k\cdot(U_{sig}+U_{nar})|$. The shapes of these two signals are shown in FIGS. 3 and 4, respectively. The two signals obtained as above are applied to respective inputs of the multiplication unit, which multiplies them to give at the output thereof a resultant signal of a spectrum illustrated in FIG. 5. The resultant signal is then filtered in bandpass filter 10 having a frequency pass band [$\Delta F_{nar}$, ($F_1-F_0$)]. In this case, the narrow-band interference serves as a heterodyne for desired signals, and if the condition, under which the spectrum frequency band $\Delta F_{nar}$ is much smaller than the frequency band of the squared amplitude variation spectrum of the modulated broadband noise signal voltage, is fulfilled, the narrow-band interference itself is eliminated after the resultant multiplication signal has been passed through the bandpass filter having a frequency pass band [$\Delta F_{nar}$, ($F_1-F_0$)]. Then, by separating the envelope from the filtered signal, it is possible to obtain a desired power-modulated signal, which is then processed by common demodulation techniques to obtain an information signal (FIG. 6). Moreover, power modulation $F_{mod}$ can be effected by various methods, for example, using amplitude-frequency modulation or pulse modulation and any encoding methods and pseudorandom sequences.

Information is, therefore, incorporated in signal power variation and transmitted over the entire frequency band ($F_0$, $F_1$), and when the spectrum is transferred by processing in the receiver, it is transferred together with the spectrum.

It follows, therefore, that the spectral band of interference power variation, rather than the frequency band of the interference in the ambient is the limiting factor for this method of suppressing a narrow-band interference, making it even possible to suppress a scanning interference without knowing its actual location in the ambient.

REFERENCES

1. "Address Control and Communication Systems," edited by G. I. Tuzov, Radio & Communications, Moscow, 1993, pp. 256–259 and 261–264.

2. RU 2,127,021, C1, (V. V. Kalugin et al.), Feb. 27, 1999.

The invention claimed is:

1. A method of suppressing a narrow-band interference in a broadband communication system, wherein a broadband noise signal is formed in the transmission channel in a frequency band ($F_0$, $F_1$); the broadband noise signal is modulated by a given modulation technique to modulate the power thereof at a modulation frequency $F_{mod}<<(F_1-F_0)$; the resultant signal is passed through a propagation medium and received by the receiver together with a narrow-band interference superimposed thereon in the propagation medium, and filtered in the frequency band ($F_0$, $F_1$); two signals are formed, one of which is obtained by amplifying the signal filtered in the frequency band ($F_0$, $F_1$) and limiting the amplitude thereof, and the second signal is the above filtered signal or a filtered signal linearly amplified without altering the shape thereof; the two signals thus obtained are multiplied; the resultant signal is filtered in the frequency band [$\Delta F_{nar}$, ($F_1-F_0$)]; and the envelope of the signal obtained is separated and demodulated to obtain an information signal, wherein $\Delta F_{nar}$ is the frequency band of the squared amplitude variation spectrum of the interference voltage.

* * * * *